UNITED STATES PATENT OFFICE.

WESLEY EVENTUS DOUD, OF EUREKA, KANSAS.

RUBBER CEMENT FOR THE MANUFACTURE OF MEMORANDUM BLOCKS AND TABLETS.

SPECIFICATION forming part of Letters Patent No. 285,980, dated October 2, 1883.

Application filed September 5, 1883. (No specimens.)

*To all whom it may concern:*

Be it known that I, W. E. DOUD, a citizen of the United States, and a resident of Eureka, in the county of Greenwood and State of Kansas, have invented certain new and useful Improvements in Rubber Cement for the Manufacture of Memorandum Blocks and Tablets; and I do hereby declare that the following is a full, clear, and exact description of the invention, which will enable others skilled in the art to which it appertains to make and use the same.

My invention has relation to the manufacture of memorandum blocks or tablets; and it consists in an improved glue compound or cement for fastening the edges of the leaves together, as hereinafter more fully described and claimed.

I prepare this compound by mixing, in a closed vessel, one pound of pure rubber, six pounds of bisulphuret of carbon, and one pound of ultramarine. The rubber is dissolved by the bisulphuret, after which the ultramarine will readily mix with it, forming a blue paste of great tenacity. This paste or cement is applied to the edges of the block or tablet, where the leaves are to be united, by an ordinary paint-brush. After the cement has dried, it will be found to form a flexible back, so that the leaves of the block or tablet may readily be turned without breaking the back, as where glue or mucilage is used, or similar cement compositions which become brittle when dry. At the same time the leaves may readily be detached from the block or tablet in the usual manner.

I claim and desire to secure by Letters Patent of the United States—

A cement compound for the manufacture of memorandum blocks or tablets, composed of pure rubber, bisulphuret of carbon, and ultramarine, mixed in about the proportions set forth.

In testimony that I claim the foregoing as my own I have hereunto affixed my signature in presence of two witnesses.

WESLEY EVENTUS DOUD.

Witnesses:
WM. C. THRASHER,
ALMER HOWARD.